Patented Nov. 14, 1950

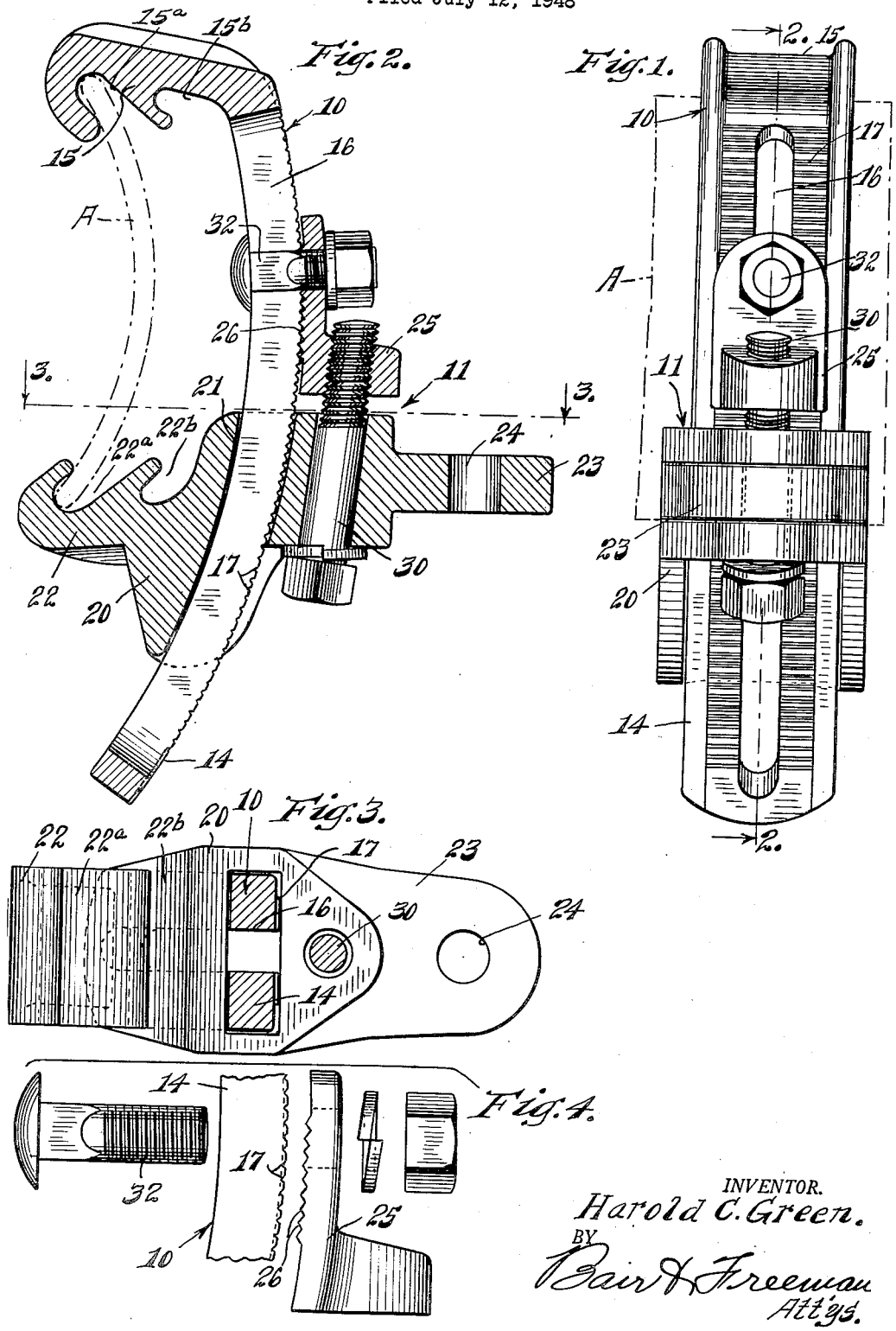

2,529,686

UNITED STATES PATENT OFFICE 2,529,686

BUMPER HITCH

Harold C. Green, Hastings, Nebr., assignor to Dutton-Lainson Company, Hastings, Nebr., a corporation of Nebraska Application July 12, 1948, Serial No. 38,322

9 Claims. (Cl. 280—33.44)

The present invention relates to a hitch of the type adapted to be attached to the rear end of an automobile for use in connection with a trailer vehicle. More particularly, the present invention is directed to a hitch of the type adapted for attachment to and mounting directly upon a bumper of an automobile.

One of the main objects of this invention is to provide an improved hitch of the character indicated which is constructed and arranged for use with automobile bumpers of various widths and cross sectional configurations.

Another object is to provide an improved hitch having a pair of cooperating clamp elements which may be quickly and easily adjusted toward or away from each other for accommodating various widths of automobile bumpers.

A further object is to provide a novel and improved hitch of the character indicated which is constructed and arranged so as to embrace and contact only the upper and lower marginal edge portions of an automobile bumper.

Still another object is to provide an improved hitch of the character indicated comprising two main cooperating elements provided with interengaging features for assisting in retaining the elements in a desired position of adjustment.

A still further object is to provide an improved hitch of the character indicated which is of simple construction, durable in use, and capable of being economically manufactured.

Other objects and advantages of this invention will be apparent in the following description, taken in connection with the accompanying drawing, in which:

Figure 1 is a rear elevational view of the hitch embodying the present invention;

Figure 2 is a central vertical section through the hitch assembly, taken substantially as indicated at line 2—2 on Figure 1;

Figure 3 is a horizontal sectional view through the hitch, taken substantially as indicated at line 3—3 on Figure 2; and Figure 4 is a fragmentary, exploded view of certain cooperating elements of the hitch.

The trailer hitch embodying the present invention includes a clamp member indicated generally at 10, and a cooperating clamp head indicated generally at 11. The clamp member 10 includes an upright leg 14, the upper end of which terminates in a forwardly extending leg 15. The upright leg, as may be seen in Figure 2, is of slightly arcuate contour in vertical direction, and is provided with a vertically extending, elongated slot 16 extending substantially the length of said leg. The rear face of said upright leg, for approximately the full length of said slot 16 is provided at opposite sides of the slot, with a multiplicity of transversely extending serrations or teeth 17.

The clamp head is telescopically associated with the upright leg 14, and includes a main body member 20 provided with a vertically extending slot or opening 21 of arcuate contour in vertical direction for accommodating therein the upright leg of the clamp member 10. Said body member includes a forwardly extending leg 22, and is formed at its opposite end with a lug 23, provided with an aperture 24, the latter serving to receive a king pin, or coupling pin for connection of said lug 23 to a suitable fitting on the terminal end of a draw bar of a trailer vehicle.

The underface of the forwardly extending leg 15 of the clamp member is provided with a pair of transversely spaced apart, downwardly opening hook features 15a and 15b, and the upwardly facing surface of the forwardly projecting leg 22 of the clamp head is formed with a pair of similar upwardly open hook features 22a and 22b. The respective hook features 15a and 15b are disposed in approximate vertical alignment with the hook features 22a and 22b, and are employed in cooperating relation. Either set of hook features are adapted to engage the upper and lower marginal edge portions of an automobile bumper, as indicated in dot and dash outline at A, without contacting the exposed, finished, rear surface of the bumper, so that when the clamp member 10 and the clamp head 11 are firmly secured together, the hitch becomes rigidly attached to the bumper. The other set of cooperating hook features 15b and 22b are adapted to be employed in connection with a bumper of lesser width and/or of different cross sectional configuration.

The clamp head also includes an L-shaped lug 25, the upright leg of which is adapted to be positioned against the rear face of the upright leg 14 of the clamp member 10, and its adjacent face is provided with a multiplicity of transversely extending serrations or teeth 26 for cooperating with the transverse serrations 17 on the rear face of said upright leg for assisting in maintaining the clamp head in a pre-determined relationship to the clamp member.

The L-shaped lug 25 is connected to the main body member 20 by a bolt 30 extending through said body member in an upwardly direction, and threaded into the horizontally extending leg of the L-shaped lug, as clearly seen in the drawing.

Thus, by virtue of this connection, the main body member is supported by the L-shaped lug.

The L-shaped lug supporting the main body member is adapted to be firmly secured in a desired position of adjustment on the upright leg of the clamp member 10 by means of a bolt 32 extending through the upright leg of the L-shaped lug, and through the slot 16 of the upright leg of the clamp member, as seen in Figure 2 of the drawing.

As shown in the drawing, the clamp member 10, the body member 20 and the L-shaped lug 25, are formed as castings, and the only machining operations necessary are in the threading of the opening of the horizontally extending leg of the L-shaped lug 25. If desired, however, the openings for receiving the bolts 30 and 32 in the main body member 20, and in the upright leg of the lug 25, may be drilled or reamed.

It will now be apparent that by virtue of the two sets of hook features provided in the clamp member 10 and body member 20, a plurality of sizes of bumpers of various widths and configurations can be readily accommodated. Adjustment of the clamp member relatively to the clamp head may be quickly and easily made by merely loosening the nut of the bolt 32, so as to permit the head to be moved vertically on the upright leg of said clamp member 10. If desired, suitable adjustment for certain purposes may be obtained by loosening of the bolt 30 which connects the main body member 20 to the lug 25. Irrespective of the position of adjustment of the clamp head on the upright leg of the clamp member, the serrations or toothed portions of said upright leg member, when engaged by the serrations or toothed portions on the adjacent face of the lug 25, serve to assist in securing the clamp head in a desired position of adjustment with respect to the clamp member, and thus insure obtaining a firm clamping connection of the cooperating parts of the hitch.

Although I have herein shown and described a preferred embodiment of my invention, manifestly it is capable of modification and rearrangement of parts without departing from the spirit and scope thereof. I do not, therefore, wish to be understood as limiting this invention to the precise form herein disclosed, except as I may be so limited by the appended claims.

I claim as my invention:

1. A trailer hitch comprising a clamp member having an upright leg, terminating at one end in a forwardly extending leg, a clamp head mounted for vertical adjustment on said upright leg, said head having a forwardly extending leg, a portion of the cooperating surfaces of said upright leg and said clamp head being formed with a series of cooperating, transversely extending serrations for assisting in maintaining said parts in a predetermined position of adjustment, said forwardly extending legs of said clamp member and head being formed with oppositely facing, cooperating hook features, disposed in approximate vertical alignment, and means for firmly securing said head on said upright leg of the clamp member, with said hook features disposed in a desired, spaced apart cooperating relation, for engagement with the upper and lower edges of an automobile bumper.

2. A trailer hitch comprising a clamp member having an upright leg, terminating at one end in a forwardly extending leg, a clamp head mounted for vertical adjustment on said upright leg, said head having a forwardly extending leg, said forwardly extending legs of said clamp member and head being formed with oppositely facing, cooperating hook features, disposed in approximate vertical alignment, said upright leg being formed with a vertically extending slot, and means attached to said clamp head, including a bolt and extending through said slot, for firmly securing said head on said upright leg of the clamp member, with said hook features disposed in a desired, spaced apart cooperating relation, for engagement with the upper and lower edges of an automobile bumper.

3. A trailer hitch comprising a clamp member having an upright leg, terminating at one end in a forwardly extending leg, a clamp head mounted for vertical adjustment on said upright leg, said head having a forwardly extending leg, said forwardly extending legs being formed with oppositely facing, cooperating hook features disposed in approximate vertical alignment, said upright leg being formed with a vertically extending slot, a clamp lug cooperating with said upright leg, a bolt carried by said lug and extending through said slot for firmly securing said lug to said upright leg at a desired position of vertical adjustment thereon, and a bolt for connecting said lug and head for supporting the latter on the upright leg.

4. A trailer hitch comprising a clamp member having an upright leg, terminating at one end in a forwardly extending leg, a clamp head mounted for vertical adjustment on said upright leg, said head having a forwardly extending leg, said forwardly extending legs being formed with oppositely facing, cooperating hook features disposed in approximate vertical alignment, said upright leg being formed with a vertically extending slot, a clamp lug cooperating with said upright leg, a bolt carried by said lug and extending through said slot for firmly securing said lug to said upright leg at a desired position of vertical adjustment thereon, and a bolt for connecting said lug and head for supporting the latter on the upright leg, said last mentioned bolt being screw threaded into said lug for securing said head thereto at a desired position of vertical adjustment.

5. A trailer hitch comprising a clamp member having an upright leg, terminating at one end in a forwardly extending leg, a clamp head formed for telescopic vertical adjustment on said upright leg, said head having a forwardly extending leg, said forwardly extending legs being formed with oppositely facing, cooperating hook features disposed in approximate vertical alignment, said upright leg being formed with a vertically extending slot, a clamp lug cooperating with said upright leg, a bolt carried by said lug and extending through said slot for firmly securing said lug to said upright leg at a desired position of vertical adjustment thereon, and a bolt for connecting said lug and head for supporting the latter on the upright leg.

6. A trailer hitch comprising a clamp member having an upright leg, terminating at one end in a forwardly extending leg, a clamp head mounted for vertical adjustment on said upright leg, said head having a forwardly extending leg, said forwardly extending legs formed with oppositely facing, cooperating hook features disposed in approximate vertical alignment, said upright leg being formed with a vertically extending slot, a clamp lug cooperating with said upright leg, a bolt carried by said lug and extending through said slot for firmly securing said lug to said upright leg at a desired position of vertical adjustment thereon, and a bolt for connecting said lug and head for supporting the latter on the upright leg, the cooperating faces of said lug and upright leg being formed with a multiplicity of transverse serrations for assisting in maintaining said lug in a desired position of adjustment on said upright leg.

7. A trailer hitch comprising a clamp member having an upright leg, terminating at one end in a forwardly extending leg, a clamp head mounted for vertical adjustment on said upright leg, said head having a forwardly extending leg, said forwardly extending legs of said clamp member and head each being formed with a plurality of oppositely facing, cooperating hook features disposed in approximate vertical alignment, said upright leg being formed with a vertically extending slot, a clamp lug cooperating with said upright leg, a bolt carried by said lug and extending through said slot for firmly securing said lug to said upright leg at a desired position of vertical adjustment thereon whereby an aligned set of said hook features are adapted for engagement with the upper and lower edges of an automobile bumper, and a bolt for connecting said lug and head for supporting the latter on the upright leg.

8. A trailer hitch comprising a clamp member having an upright leg, terminating at one end in a forwardly extending leg, a clamp head mounted for vertical adjustment on said upright leg, said head having a forwardly extending leg, said forwardly extending legs being formed with oppositely facing, cooperating hook features disposed in approximate vertical alignment, said clamp head being formed with a rearwardly extending apertured lug for connection to the terminal end of a trailer draw-bar, said upright leg being formed with a vertically extending slot, a clamp lug cooperating with said upright leg, a bolt carried by said lug and extending through said slot for firmly securing said lug to said upright leg at a desired position of vertical adjustment thereon, and a bolt for connecting said lug and head for supporting the latter on the upright leg.

9. A trailer hitch comprising a clamp member having an upright leg, terminating at one end in a forwardly extending leg, the underside of said forwardly extending leg being formed with a downwardly facing open hook feature, a clamp head mounted for vertical adjustment on said upright leg, said head having a forwardly extending leg the upper side of which is formed with an upwardly facing open hook feature, said forwardly extending legs being formed with oppositely facing, cooperating hook features disposed in approximate vertical alignment, said upright leg being formed with a vertically extending slot, a clamp lug cooperating with said upright leg, a bolt carried by said lug and extending through said slot for firmly securing said lug to said upright leg at a desired position of vertical adjustment thereon, and a bolt for connecting said lug and head for supporting the latter on the upright leg.

HAROLD C. GREEN.

REFERENCES CITED

The following references are of record in the file of this patent:

UNITED STATES PATENTS

| Number | Name | Date |
| --- | --- | --- |
| 2,092,593 | Seys | Sept. 7, 1937 |
| 2,250,661 | Thorp et al. | July 29, 1941 |
| 2,306,007 | Thorp | Dec. 22, 1942 |
| 2,338,934 | Gross | Jan. 11, 1944 |